United States Patent Office 2,827,106
Patented Mar. 18, 1958

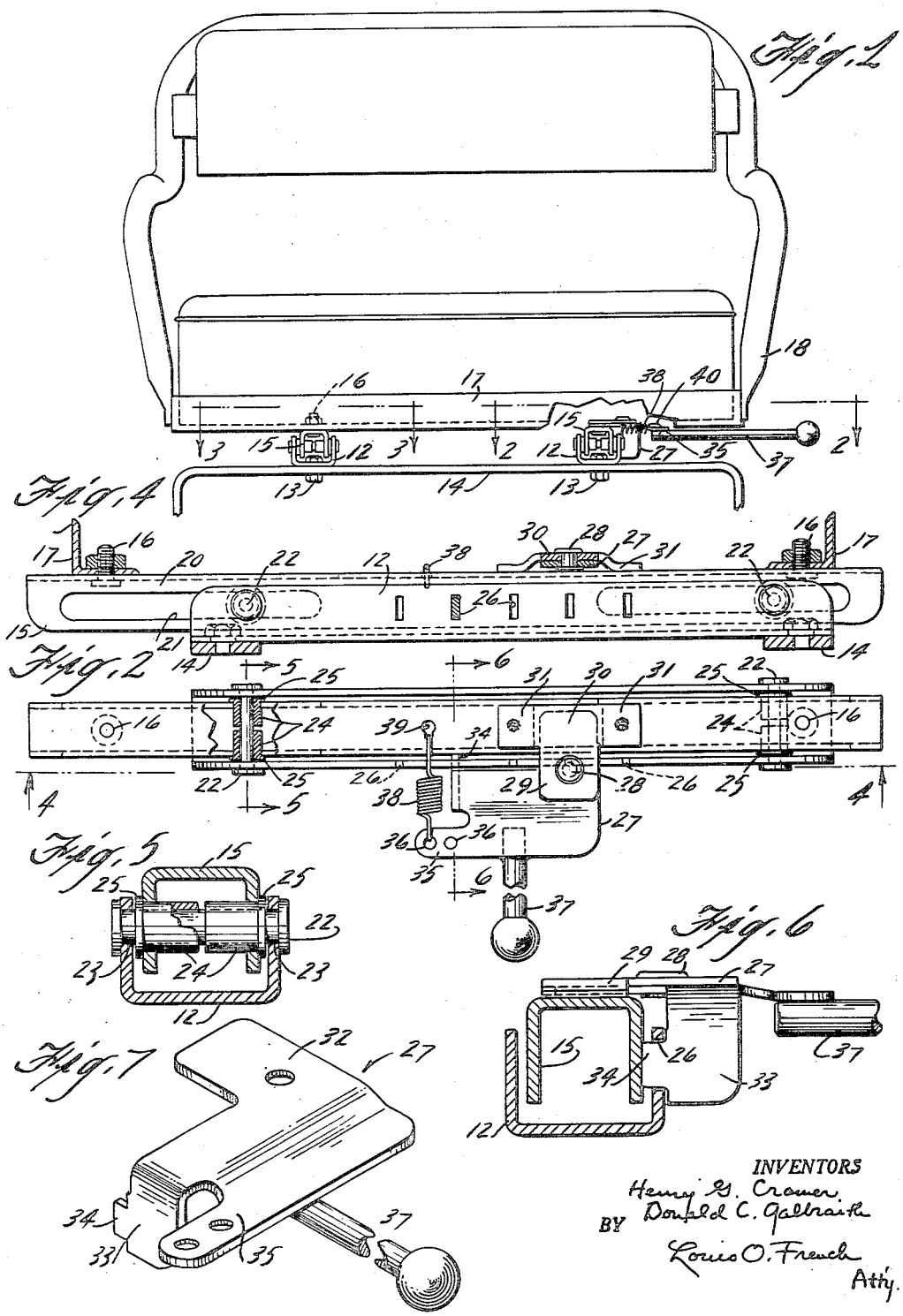

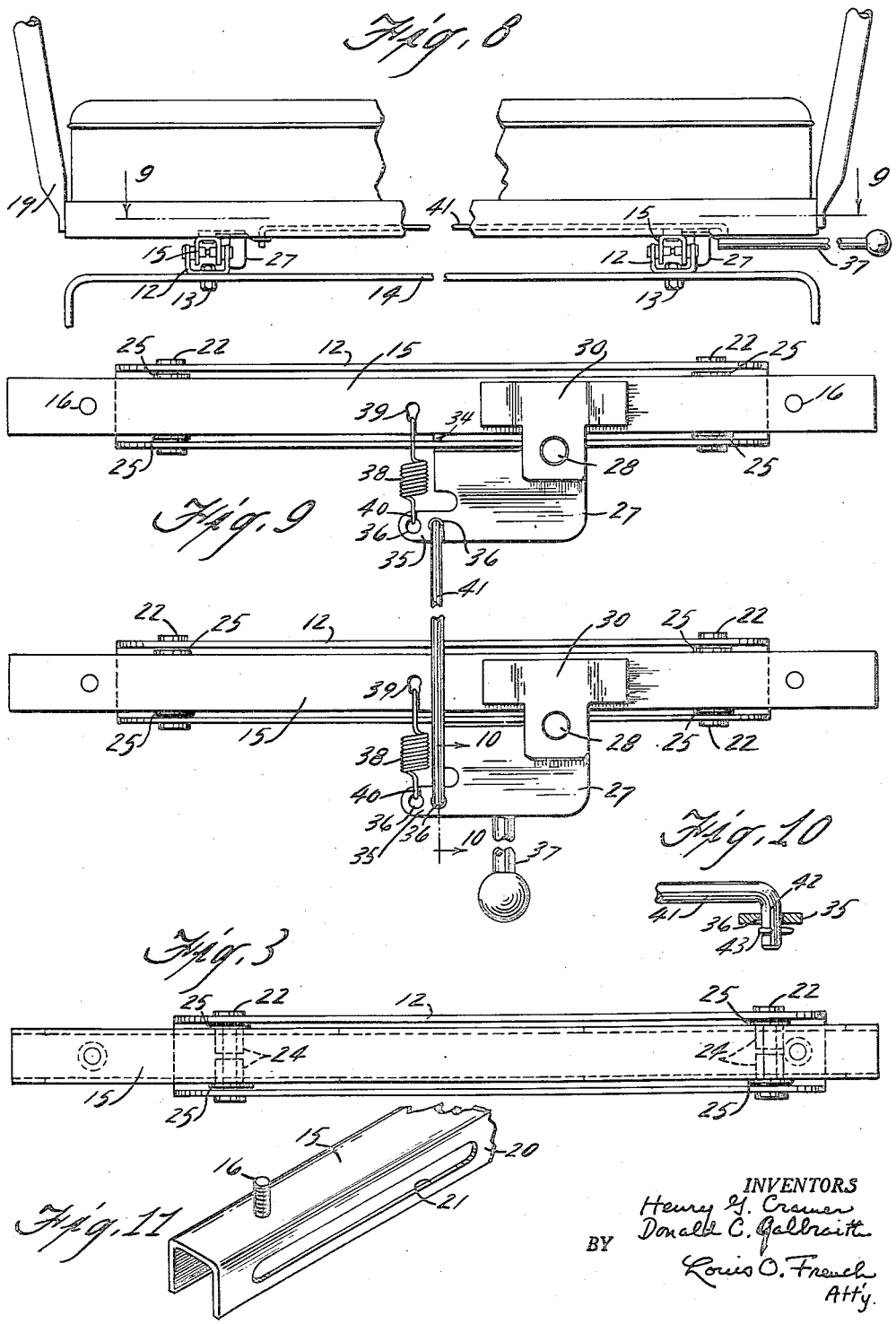

2,827,106

SEAT SLIDE

Henry G. Cramer, Whitefish Bay, and Donald C. Galbraith, Milwaukee, Wis., assignors to Milsco Manufacturing Company, Milwaukee, Wis., a corporation of Wisconsin Application February 18, 1957, Serial No. 640,928

6 Claims. (Cl. 155—14)

The invention relates to slidably adjustable seats and more particularly to the slide construction of said seats.

Many forms of seat slides have been proposed and patented and many of these forms of seat slides have been rejected or found wanting for practical use because the guide means for the slides are open to clogging with dirt or other foreign matter which in the case of seat slides for the seat or seats of tractor vehicles is an ever present factor and which is also present to some extent in the case of front seats for motor vehicles. One object of the present invention is to provide a seat slide construction that offers a minimum chance for clogging due to foreign matter with a simple form of latching mechanism to hold the seat in its position of adjustment.

The invention further consists in the several features hereinafter set forth and more particularly defined by claims at the conclusion hereof.

In the drawings:

Fig. 1 is a front elevation view of a seat equipped with slides embodying the invention, parts of the seat being broken away;

Fig. 2 is a top plan view of one of the slides looking along the line 2—2 of Fig. 1;

Fig. 3 is a top plan view of another side looking along the line 3—3 of Fig. 1;

Fig. 4 is a vertical sectional view of the slide shown in Fig. 2 taken on the line 4—4 of Fig. 2, parts being broken away and parts shown in section;

Fig. 5 is a detailed vertical sectional view taken on the line 5—5 of Fig. 2;

Fig. 6 is a detailed vertical sectional view taken on the line 6—6 of Fig. 2;

Fig. 7 is a perspective view of the latch;

Fig. 8 is a view similar to Fig. 1 of a longer seat, parts being broken away;

Fig. 9 is a plan view looking along the line 9—9 of Fig. 8 showing the slides for the longer seat;

Fig. 10 is a detailed vertical sectional view taken on the line 10—10 of Fig. 9;

Fig. 11 is a detailed perspective view of a portion of one of the slide members.

Referring to the drawings, each slide assembly includes a base metal channel member 12 adapted to be secured by bolts 13 to a fixed base member 14 and co-operating with a metal channel slide 15 adapted to be secured by bolts 16 to frame members 17 on the seat 18 or the seat 19 and working between the sides of the channel member 12.

At each end, the opposite sides 20 of the channel slide 15 are provided with elongated registering slots 21. In the region of the slots 21 channel member 12 is provided with headed pins or shafts 22 extending transversely through apertures 23 in its opposite sides.

Each of the pins 22 carries a pair of oppositely disposed hardened metal rollers 24, each having a flanged end or collar 25. The main body of each roller 24 has a sliding fit in the slot 21 in the associated side of member 12 and the flanged ends 25 of the rollers are disposed between the sides of the channel member 12 and 15 as shown in Fig. 5 and form side bearings for the slide. Thus each slide member 15 is carried on spaced sets of bearing rollers supported by the spaced pins 22 mounted on the base channel member 12, so that the slide 18 is free to move lengthwise of the member 12 to the extent permitted by the lengths of the slots 21, and as the slides are carried by the seat, the seat is likewise permitted to move lengthwise relative to its supporting base. The rollers 24 preferably extend inwardly from their flanged ends to a point closely adjacent each other to provide an extensive bearing area though the rollers of each set do have limited lengthwise movement relative to each other to accommodate for possible inaccuracies in the alinement of the slides with their supporting members and yet prevent the possible lodgement of foreign matter interfering with the free action of the slides.

In order to hold the slides and hence the seat that carries them in an adjusted position, one of the slides in the case of a single seat and both of the slides in the case of a double or longer seat should be locked against lengthwise movement relative to the supporting base.

For the single seat 18 shown in Fig. 1, a locking means is provided for one of the slides and comprises a series of spaced slots 26 formed in the outer side of the channel 12 of one slide assembly and a latch 27 pivotally mounted on a pin 28 fixed to the laterally extending portion 29 of a bracket 30 whose base ends 31 are spot welded to the top portion of the slide member 15 of this assembly. The detailed form of the latch 27 is shown in Fig. 7 and includes a sheet metal stamping having the apertured portion 32 to receive the pin 28, an angled portion 33 having the slot engaging end 34, and an arm 35 provided with spaced apertures 36 to which stamping a laterally projecting arm or lever 37 is welded. The latch is normally urged to latching position by a coiled spring 38 having a hooked end engageable in a slot 39 in the top of the slide 15 and having a hooked end 40 for engagement in one of the apertures 36.

For the double or longer seat, each of the slide assemblies is provided with the latching means above described and similarly numeralled except that one of the latches 27 is not provided with an operating handle but is operatively connected by a link rod 41 to the handle carrying latch member so that operation of this last named member will operate the other latch member. One of the holes 36 of each latch member 27 is used to pivotally connect the angled end 42 of the link 41 to it, as shown in Fig. 10, the link being retained in pivoted engagement with its latch member by a cotter pin 43.

It is to be noted from Fig. 6 that the length of the projection 33 is such that the front end of this projection bears against the front face of the adjacent side of the channel member 15 when in a locked position which has the effect of holding the slide against the flanges 25 of the rollers 24, and these flanges in turn against the side of the member 12 through which the latch projects, and thus firmly hold the seat in its adjusted position.

With the above construction when either the latch or latches are released by the disengagement of the projection or projections 34 with one of notches 26 in the base member or members of the slide, the seat may be moved lengthwise relative to its support to the desired position and the latches then permitted to return to lock the seat in its desired position. The manually operated arm or lever 37, it will be noted from Figs. 1 and 8, projects beyond the side of the seat so that it may be readily manipulated by the operator.

We desire it to be understood that this invention is not to be limited to the specific construction and arrangement of the parts except in so far as such limitations are included in the claims.

What we claim as our invention is:

1. In a seat slide structure, the combination of a supporting channel member having spaced transversely disposed pins mounted in the side portions thereof, a channelled seat carrying slide member having its side portions working between the sides of said supporting member and spaced inwardly thereof and provided with oppositely disposed elongated slots in the region of said pins, side bearing means on said pins in the space between the sides of the slide member and the sides of said supporting member, roller bearing means mounted on said pins and extending through said slots in working engagement with the side edges thereof, and means for securing said slide member in different positions of lengthwise adjustment relative to said supporting member.

2. In a seat slide structure, the combination of a supporting channel member having spaced transversely disposed pins mounted in the side portions thereof, a channelled seat-carrying slide member having its side portions working between the sides of said supporting member and spaced inwardly thereof and provided with oppositely disposed slots in the region of said pins, rollers mounted on said pins and extending through said slots in working engagement with the side edges thereof and having end collars forming side bearings disposed in the space between the sides of the slide member and the sides of said supporting member, and means for securing said slide member in different positions of lengthwise adjustment relative to said supporting member.

3. The slide structure as defined in claim 2, wherein the roller bearings on said pins have limited lengthwise movement relative to each other.

4. The slide structure as defined in claim 1, wherein the means for securing said slide member in different positions of lengthwise adjustment relative to said supporting member comprises a series of lengthwise spaced slots in one side of said supporting member, a manually operable latch member pivotally supported from the top portion of said slide member, and a spring connected at one end with the top of said slide member and at its other end with said latch to normally urge said latch to its latching position in one of said slots.

5. The slide structure as defined in claim 4, wherein the slot engaging portion of said latch bears at its inner end on the adjacent side of the channel of said slide member when in locked position.

6. A seat slide structure comprising a pair of spaced slide structures as defined in claim 4, wherein a link operatively connects the latches of said structures and one of the latches is provided with an operating handle.

References Cited in the file of this patent

UNITED STATES PATENTS

| | | |
|---|---|---|
| 1,040,907 | Dunleavy | Oct. 8, 1912 |
| 2,100,546 | Kramer | Nov. 30, 1937 |
| 2,226,374 | Gieleghem | Dec. 24, 1940 |
| 2,234,442 | Lustig | Mar. 11, 1941 |